(12) United States Patent
Cutajar et al.

(10) Patent No.: US 6,189,754 B1
(45) Date of Patent: Feb. 20, 2001

(54) OUTBOARD MOTOR AND GAS TANK CARRIER

(76) Inventors: Vince Cutajar, 26 McGraw Avenue, Brampton, Ontario (CA), L6X 3M4; Kenneth Chadwick, 374 Hansen Road, Brampton, Ontario (CA), L6V 3P7

( * ) Notice: Under 35 U.S.C. 154(b), the term of this patent shall be extended for 0 days.

(21) Appl. No.: 09/280,838

(22) Filed: Mar. 30, 1999

(51) Int. Cl.[7] ............................................. B60R 9/06
(52) U.S. Cl. ................................. 224/519; 224/531
(58) Field of Search ................................ 224/519, 520, 224/521, 531, 532

(56) References Cited

U.S. PATENT DOCUMENTS

| D. 322,423 | * | 12/1991 | Greenberg | D12/317 |
|---|---|---|---|---|
| D. 363,695 | * | 10/1995 | Sargent | D12/317 |
| 2,592,050 | * | 4/1952 | McCharen | 224/521 |
| 3,039,634 | * | 6/1962 | Hobson et al. | 224/519 |
| 4,136,806 | * | 1/1979 | Wisz | 224/519 |
| 4,241,858 | * | 12/1980 | Lawroski | 224/42.03 |
| 4,381,069 | * | 4/1983 | Kreck | 224/521 |
| 4,465,423 | * | 8/1984 | Anderson | 414/462 |
| 5,020,708 | * | 6/1991 | Kalbach | 224/42.32 |
| 5,232,135 | * | 8/1993 | Marren | 224/42.43 |
| 5,509,592 | * | 4/1996 | Lipka | 224/521 |
| 5,699,985 | * | 12/1997 | Vogel | 224/521 |
| 5,803,330 | * | 9/1998 | Stack et al. | 224/519 |

* cited by examiner

Primary Examiner—Stephen P. Garbe

(57) ABSTRACT

A carrier for attachment to a motor home or vehicle for transporting small outboard motors and their associated gasoline tanks is described. The carrier has a generally rectangular base for releasable attachment to a motor vehicle. The base has an outboard motor support for supporting an outboard motor in a position to maintain the propeller lower than the engine casing and a gasoline tank storage receptacle for securely transporting the gasoline tank for the outboard motor.

5 Claims, 4 Drawing Sheets

OUTBOARD MOTOR AND GAS TANK CARRIER

FIELD OF THE INVENTION

The present invention relates to an apparatus that permits an outboard motor and gas tank to be transported securely and safely on the exterior of a vehicle, including motor vehicles, motorhomes and camping trailers.

BACKGROUND OF THE INVENTION

Many people with small boats, particularly collapsible boats, transport their boats and the outboard motor within the vehicle. The user may merely load the outboard motor and gas tank into the trunk of the automobile or place them on the floor inside a camper. This can cause hazardous conditions when unpleasant smelling gasoline fumes accumulate. In addition, there is a risk of damage to the motor or spills from the gasoline tank during motion of the motor vehicle, particularly during sudden starts and stops if the motor and gasoline tank are not properly secured. A further hazard is that any water that may be left inside the drive housing of the motor may flow into the working parts of the motor, such as the carburetor or cylinder, which may require that the motor be disassembled prior to the next use.

There have been a number of outboard motor carriers for motor vehicles proposed for carrying the outboard motor on the exterior of the motor vehicle. Examples of such carriers are illustrated in U.S. Pat. Nos. 4,381,069, 4,136,803, 5,509,592, 4,625,900 and Design Pat. Nos. 322,423 and 363,695. Most of these carriers are designed to be attached to a trailer hitch with the exception of U.S. Pat. No. 4,625,900, which is attachable to a spare tire carrier or bumper of a motor vehicle. All of the patents describe carriers having a rigid metal support arm attached to the trailer hitch at one end and having a flat plate, preferably covered with flat wooden sheets to serve like a transom of a boat for attaching the clamps of an outboard motor. The designs all enable the outboard motor to be transported safely and securely at the exterior of a motor vehicle. While all of these carriers provide for a secure means for transporting the outboard motor, none of the carriers deal with the problems associated with the transport of the gasoline tank within the automobile.

SUMMARY OF THE INVENTION

In one aspect, the present invention is directed to a carrier for attachment to a motor vehicle for transporting small outboard motors and their associated gasoline tanks. The carrier comprises a generally rectangular base for releasable attachment to a motor vehicle. The base has an outboard motor support for supporting an outboard motor in a position to maintain the propeller lower than the engine casing and a gasoline tank securing means for securely transporting the gasoline tank for the outboard motor.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
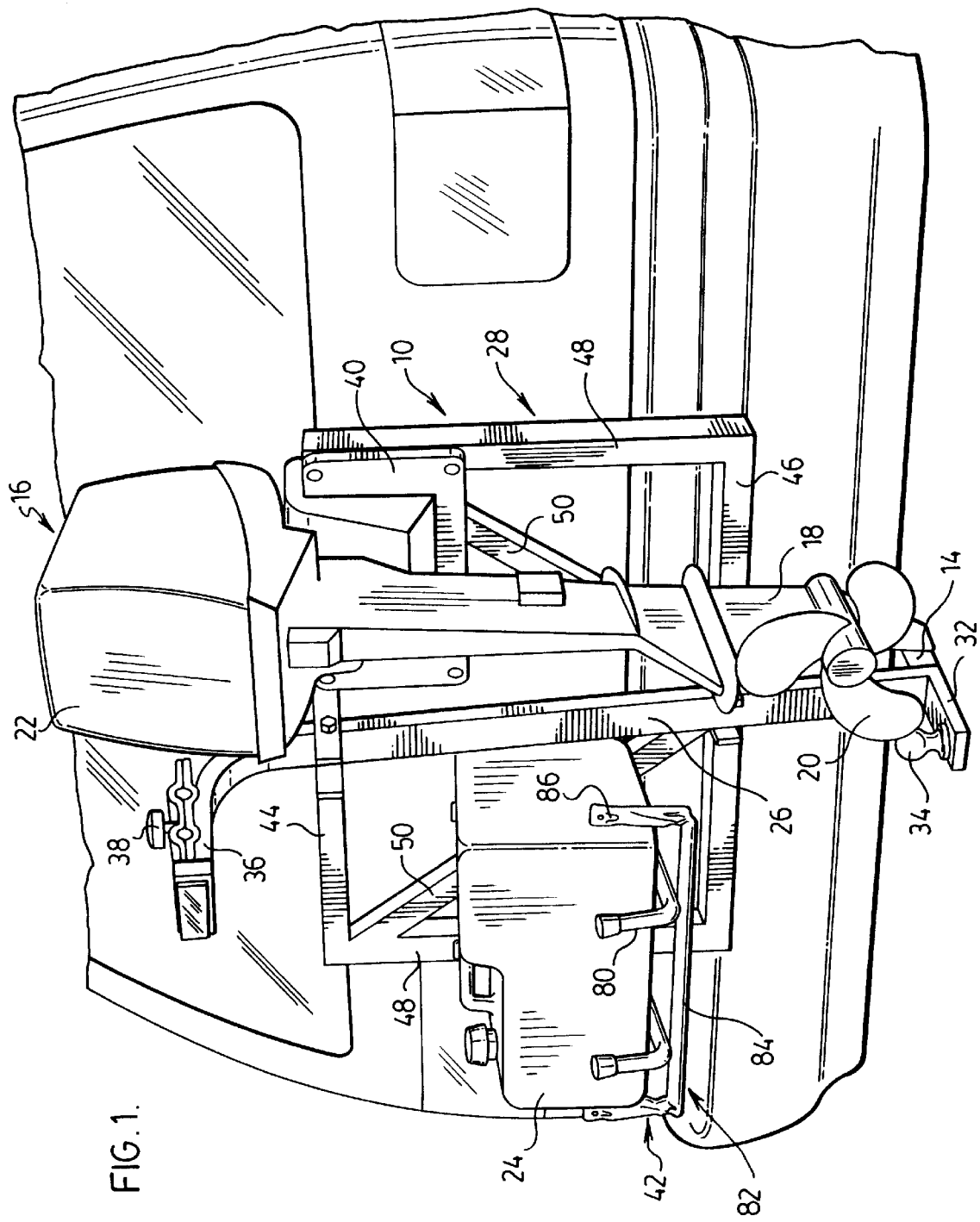
FIG. 1 is a perspective view of a first embodiment of an outboard motor carrier of the present invention, illustrated attached to a motor vehicle.
Figure 2:
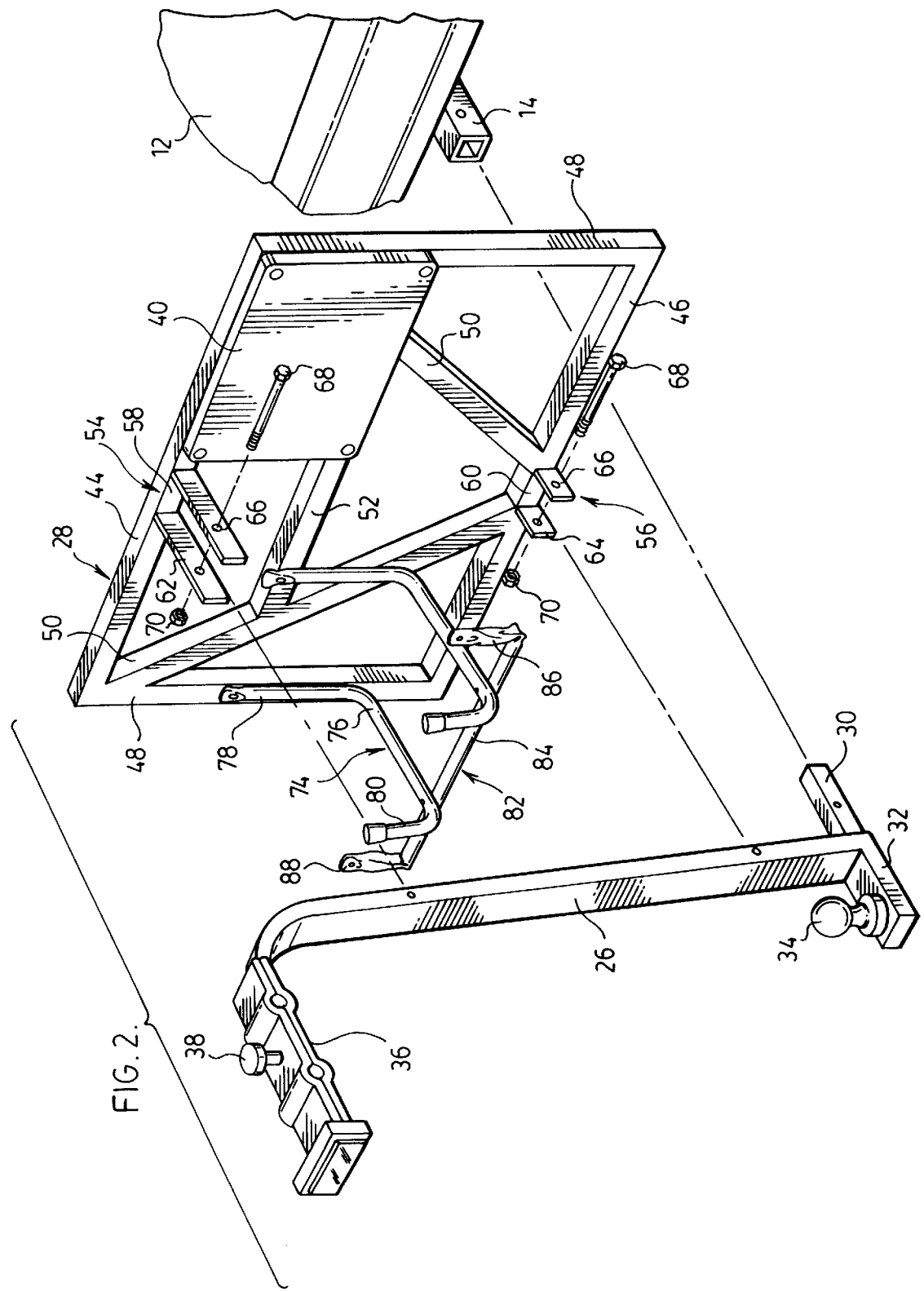
FIG. 2 is an exploded perspective view of the outboard motor carrier of FIG. 1.

A first embodiment of an outboard motor carrier of the present invention is illustrated in FIGS. 1 and 2, generally indicated by the numeral 10. This embodiment of the outboard motor carrier 10 is designed for attachment to the rear of a motor vehicle 12, and in particular to a trailer hitch assembly 14, as will be described further below. The outboard motor carrier 10 is provided with a means for supporting an outboard motor 16 in a generally vertical position to maintain the drive casing 18 and its associated propeller 20 lower than the engine casing 22. The outboard motor carrier is also provided with a means for supporting the gasoline tank 24 for the outboard motor 16, also in a generally vertical and secure position.

The details of the construction of the outboard motor carrier 10 of the first embodiment are illustrated in FIG. 2. The outboard motor carrier 10 has a support arm 26 extending upwardly from the trailer hitch 14 to which is attached a rectangular metal frame 28 holding the outboard motor attachment means and gasoline tank attachment means. The support arm 26 at the lower end is provided with a means for attaching to a trailer hitch assembly. This means for attaching to the trailer hitch assembly will vary depending upon the nature of the trailer hitch assembly, in particular, the class of the trailer hitch assembly. A class 1 trailer hitch assembly has the trailer ball platform directly connected to the motor vehicle. For these types of trailer hitches, a support arm would be provided with a bolt to enable the support arm to be bolted to the trailer hitch assembly, utilizing the hole provided in the platform for the trailer ball. Class 2 and class 3 trailer hitch assemblies utilize a square socket which accepts an extension arm of a trailer ball hitch platform. For these classes of trailer hitch assemblies, the support arm 26 at the lower end is provided with an attachment arm 30, sized to be inserted into the trailer hitch assembly 14 and attached thereto. The lower end of the support arm 26 is also preferably provided with a trailer ball hitch platform 32 having a trailer ball 34 to enable a trailer to be towed by the motor vehicle 12 even when the support arm assembly 26 is being used. When utilized with class 1 trailer hitch assemblies where the support arm 26 is attached to the hole for the typical trailer ball, a means for preventing rotation of the outboard motor carrier 10 may be provided. This means may be provided as extension plates on the sides of the support arm 26 which would lie against the edges of the trailer ball hitch platform to prevent rotation of the support arm. This would be of particular importance if the outboard motor carrier 10 is also provided with a trailer ball hitch platform 32 and trailer ball 34 to enable the trailer to be towed. The support arm 26 may also utilize part of a typical bicycle carrier rackfor attachment to trailer hitch assemblies. The upper end of such a support arm 26 curves over to provide a generally horizontal extension 36 with clamps 38 for holding one or more bicycles.

The rectangular frame 28 of the outboard motor carrier 10 is constructed of a tubular metal material to provide for the required strength for supporting the outboard motor 16 and gasoline tank 24. The rectangular frame 28 of the embodiment of the outboard motor carrier 10 illustrated in FIGS. 1 and 2 is constructed of square tubular metal welded together to provide for the rectangular frame 28. The outboard motor carrier 10 could also be constructed of round tubular metal in place of the square tubular metal however the square tubular metal has been found to be most suitable. The tubular metal frame is preferably rectangular in shape with one end being provided with a plate 40 preferably of wood to mimic the transom of a boat to allow the outboard motor 16 to be attached thereto.

The outboard motor 16 is attached to the plate 40 in a typical manner, utilizing the clamps which clamp the outboard motor 16 to a transom of a boat. In order to secure the outboard motor 16 to the plate 40 of the outboard motor carrier 10 a lock may be inserted through the holes provided in the handles of the clamps of the outboard motor 16 in the usual manner. This lock prevents the handles of the clamps from turning and thus releasing the motor from the plate 40. By locking the handles in this manner, the handles would not be able to be turned by a person which would provide security for the motor attached to the outboard motor carrier 10. In addition, during motion of the motor vehicle, the vibration could cause the handles to turn and the clamps to loosen, if the handles are not locked in a secure position. To provide for further security, the motor may also be provided with a secondary security attachment to the carrier, such as a wire releasably attached to the motor and to the outboard motor carrier.

A second end of the rectangular frame 28 is provided with a suitable carrier 42 for carrying the gasoline tank 24. The rectangular frame 28 has a top bar 44 and a bottom bar 46 joined together by sidebars 48. To strengthen the frame 28 diagonal bars 50 are provided extending from the inside corners between the top bar 44 and side bars 48 to the bottom bar 46. A crossbar 52 is located joining the two diagonal bars 50, crossbar 52 being spaced from the top bar 44 a height sufficient to enable the lower edge of the wooden plate 40 to be attached to the crossbar 52. The rectangular frame 28 is constructed by cutting the tubular metal pieces to the proper length and configuration and welding the frame together.

The rectangular metal frame 28 of the outboard motor carrier 10 of the embodiment illustrated FIGS. 1 and 2 is adapted to be attached to the support arm 26. The top bar 44 is provided with a first attachment means 54 centrally located on the top bar 44. Similarly the bottom bar 46 is provided with a second attachment means 56 centrally located on the bottom bar 46. The attachment means 54 and 56 are preferably U-shaped bar stock with the bases 58 and 60 attached to the top bar 44 or bottom bar 46 respectively and the arms 62 and 64 extending outwardly from the top bar 44 and bottom bar 46 respectively. The attachment of the attachment means 54 and 56 may be effected by bolting the means 54 and 56 to the rectangular frame 28 or they may be permanently attached by welding the bases to the frame 28. The arms 62 and 64 of the attachment means 54 and 56 are spaced apart a distance equal to the width of the support arm 26 to which the outboard motor carrier 10 is to be attached. The arms 62 and 64 of the attachment means 54 and 56 and the support arm 26 are provided with holes 66 which overlie one another when the outboard motor carrier 10 is attached to the support arm 26. Suitable bolts 68 are provided to pass through the holes 66 in the attachment means 54 and 56 and the support arm 26 and nuts 70 are attached to the ends of the bolts 68 to secure the outboard motor carrier 10 to the support arm 26. Alternatively, the support arm may be permanently attached to the outboard motor carrier 10 such as by welding.

The plate 40 for attaching the outboard motor 16 to the outboard motor carrier 10 is preferably located at an upper corner of the rectangular frame 28 and attached to the rectangular frame by a suitable means such as bolts 72. The gasoline tank securing means comprises a cage, which is attached to the rectangle frame 28 of the outboard motor carrier 10. While the embodiment of the outboard motor carrier 10 illustrated in the figures, has a plate 40 for attaching the outboard motor 16 on the upper right corner and the gasoline tank securing means on the lower left corner, it would be appreciated by those skilled in the art that the positions of these two may be reversed. This may be easily accomplished either by providing holes at both of the upper corners for the bolts 72 for attaching the plate 40 to the outboard motor carrier 10 and holes for the attachment of the cage of the gasoline tank securing means at both of the lower corners. Alternatively, the orientation of the plate 40 and gasoline tank securing means may be varied merely by reversing the orientation of the rectangular frame 28 prior to attachment of the attachment means 54 and 56 to the rectangular frame in those cases where the attachment means 54 and 56 are attached by bolts.

The cage of the gasoline securing means is preferably provided by a plurality of tubular metal members bent into U-shapes and joined to one another to form the cage. Thus, as shown in the figures two U-shaped main members 74 having a base 76 and arms 78 and 80 are joined by one or more cross members 82 also having a base 84 and arms 86. The bases 76 of the main members 74 and base 84 of the cross member 82 are of a dimension to allow a typical gasoline tank 24 to be held within the cage of the gasoline tank securing means. The arms 78 of the main members 74 are attached to the rectangular frame 28 with the base 76 and other arm 80 extending away from the rectangular frame 28. The cross member 82 provides for lateral support of the gasoline tank 24 contained within the cage of the gasoline tank securing means. The arms 86 of the cross member 82 and the arms 78 and 80 of the main members 74 are provided with holes 88. The holes on the arms 78 of the main member 74 are utilized for securing the gasoline securing means to the rectangular frame 28. The holes 88 on the arms 86 of the cross member 82 and on the shorter arms 80 of the main members are utilized for securely tying the gasoline tank 24 to the gasoline tank securing means by using bungee cords or other suitable rope. Alternatively, or in addition to this, a belt or strap may be used to strap the gasoline tank 24 to the cage. This prevents the gasoline tank 24 from moving when the motor vehicle 12 is in motion.

Figure 3:
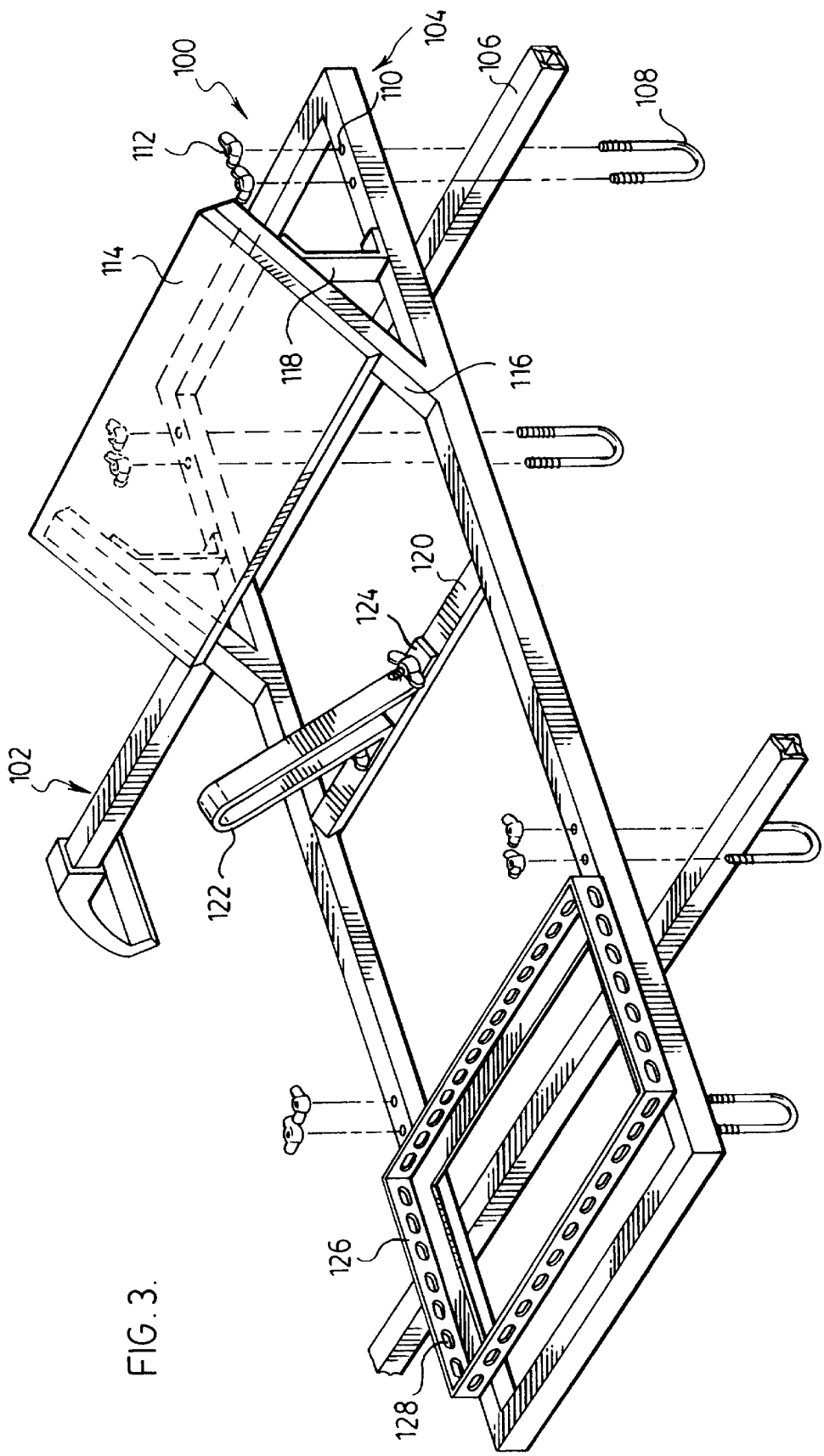
FIG. 3 is an exploded perspective view of a second embodiment of the outboard motor carrier of the present invention.
Figure 4:
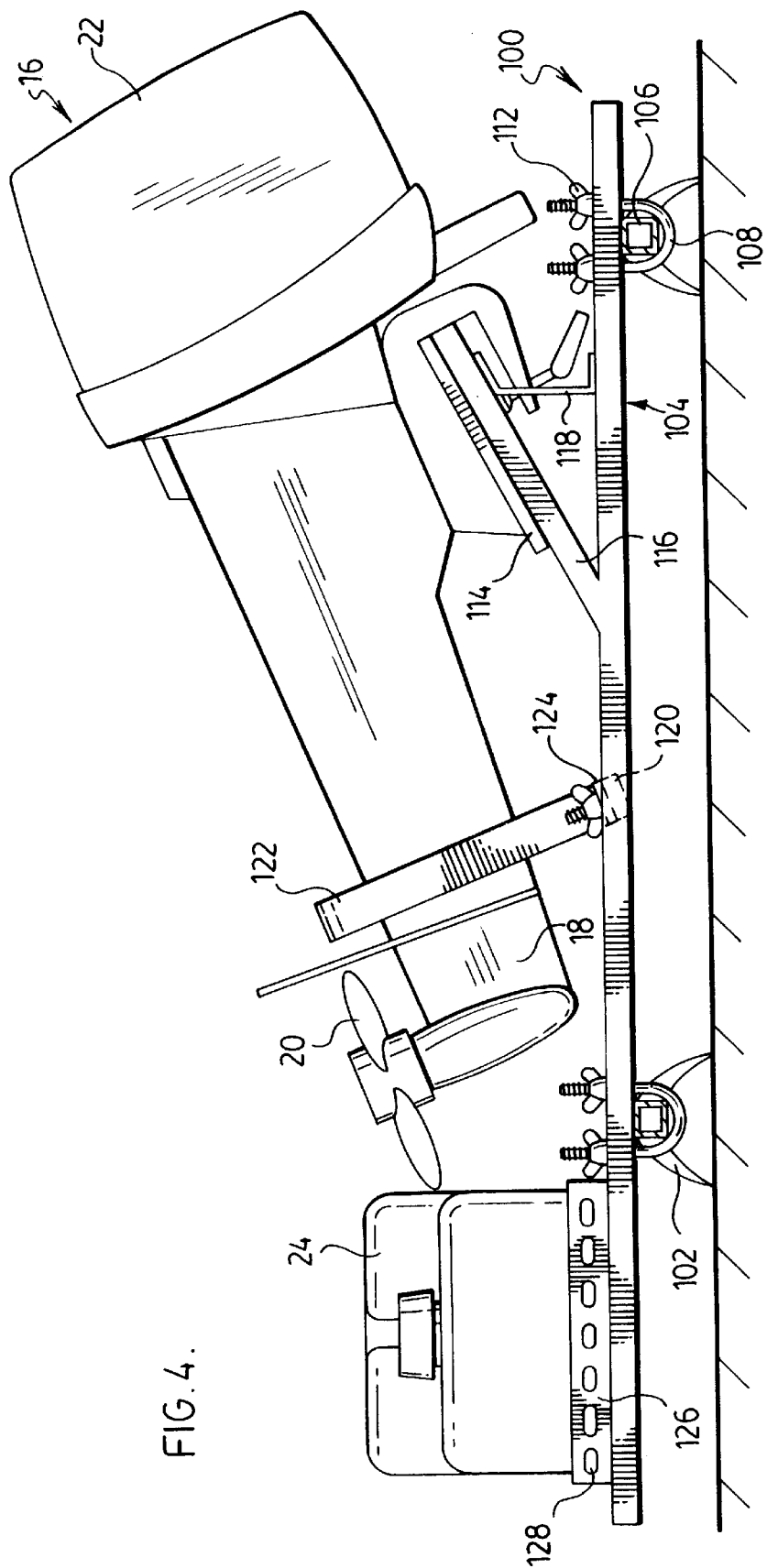
FIG. 4 is a side elevation view of the outboard motor carrier of FIG. 3, shown attached to a trailer.

A second embodiment of an outboard motor carrier of the present invention is illustrated in FIGS. 3 and 4 generally indicated by the numeral 100. This embodiment of the outboard motor carrier 100 is designed to attach to a rooftop carrier 102, which is typically found on pop-up campers. Alternatively the outboard motor carrier 100 may also be utilized in association with a rooftop carrier 102 utilized on a motor vehicle. The outboard motor carrier 100 has a rectangular frame 104 of a suitable tubular material constructed similar to the first embodiment. The rectangular frame 104 is attached to the cross supports 106 of the rooftop carrier 102 by passing U bolts 108 around the cross supports 106 of the rooftop carrier 102, through holes 110 provided in the rectangular frame 104 and then securing the bolts 108 with suitable nuts 112. The outboard motor carrier 100 is provided with an outboard motor securing means at one end of the rectangular frame 104 and a gasoline tank securing means at the second end of the rectangular frame 104. The outboard motor securing means has a wooden plate 114 attached to a tubular frame 116 which is in turn secured to the rectangular frame 104 of the outboard motor carrier 100. The outboard motor 16 is attached and secured to the plate 114 in a manner similar to the first embodiment. The tubular frame 116 of the outboard motor securing means is angled upwardly from the horizontal to maintain the drive casing 18 of the outboard motor 16 below the engine casing 22 to prevent any water which may be in the drive casing 18 of the motor 16 from being able to flow into the engine casing 22. The tubular frame 116 of the outboard motor securing means is also provided with braces 118 between the elevated end of the tubular frame 116 and the rectangular frame 104 to prevent flexing of the outboard motor securing means when the outboard motor 16 is attached and the vehicle is in motion. The outboard motor securing means is also provided with a drive shaft housing support located on a bridging member 120 which bridges the two sides on the rectangular frame 104 to provide for further support of the rectangular frame 104. The drive shaft housing support has a U-shaped member 122, which surrounds the drive shaft housing and is secured to a plate 124, attached to the bridging member 120.

The gasoline tank securing means is provided as a rectangular frame 126 of a size to accommodate the gasoline tank 24. The rectangular frame 126 is provided with holes 128 along its periphery for attachment of suitable rope or bungee cords whereby the gasoline tank 24 may be secured to the gasoline tank securing means. In addition, a belt or strap as in the first embodiment may be used.

The outboard motor carrier of the present invention provides for secure carrying and transport of not only an outboard motor but also the gasoline tank associated with the outboard motor. By carrying both the outboard motor and the gasoline tank on exterior of the vehicle the potential for harmful fumes in the interior of the motor vehicle is eliminated. In addition the outboard motor and gasoline tank no longer take up interior space and thus increase the carrying capacity of the motor vehicle. A further benefit of the outboard motor carrier of the present invention is that the outboard motor and the gasoline tank are securely transported minimizing the potential for damage to the outboard motor or the gasoline tank while the car is in motion as there is reduced likelihood of the outboard motor or the gasoline tank shifting during sudden starts or stops of the motor vehicle. The outboard motor carrier of the present invention is simple to manufacture and easy to use as it is easily attached to a trailer hitch assembly of the motor vehicle for the first embodiment or the rooftop carrier for the second embodiment. When the carrier is not in use it is easily removed from the motor vehicle and may be utilized for storing the outboard motor and gasoline tank by leaving them attached to the carrier.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. An outboard motor carrier for releaseable attachment to a trailer hitch assembly of a motor vehicle for transporting small outboard motors and their associated gas tanks, the carrier comprising a generally rectangular frame, the generally rectangular frame being vertically oriented and being attached to a vertical support arm, the support arm at a lower end having a means for releasable attachment to a trailer hitch assembly, the frame at an upper corner thereof having an outboard motor support lying in the plane of the frame for supporting an outboard motor in a position to maintain the propeller lower than the engine casing and a gasoline tank securing means at a lower corner opposite the outboard motor support for securely holding the gasoline tank of the outward motor in an upright position.

2. An outboard motor carrier according to claim 1 wherein the means for attachment to the trailer hitch assembly comprises a means for bolting the support arm to a hole in the trailer hitch assembly normally utilized for attachment of a trailer hitch ball.

3. An outboard motor carrier according to claim 2 wherein the lower end of the support arm is also provided with a trailer ball hitch platform to which a trailer hitch ball may be attached.

4. An outboard motor carrier according to claim 1 wherein the means for attachment to a trailer hitch assembly comprises an attachment arm extending horizontally from the lower end of the support arm sized to be inserted into a socket of a class 2 or higher trailer hitch assembly.

5. An outboard motor carrier according to claim 4 wherein the lower end of the support arm is also provided with a trailer ball hitch platform to which a trailer hitch ball may be attached.

* * * * *